United States Patent
de Toledo et al.

(10) Patent No.: US 7,744,050 B2
(45) Date of Patent: Jun. 29, 2010

(54) SELF-LEVELING FOOT FOR AN APPLIANCE

(75) Inventors: Carlos Eduardo Buratto de Toledo, Piracicaba (BR); Adelcio Braz, Rio Claro (BR); Antonio de Oliveira, Rio Claro (BR); Wladimir Alex Magalhaes Barcha, Rio Claro (BR); Douglas Alex Resende Pereira, Rio Claro (BR); Erico de Oliveira Munhoz, Cordeiropolis (BR); Jorge Oyama, Rio Claro (BR)

(73) Assignee: Whirlpool S.A., Sao Paulo (BR)

( * ) Notice: Subject to any disclaimer, the term of this patent is extended or adjusted under 35 U.S.C. 154(b) by 78 days.

(21) Appl. No.: 11/741,220

(22) Filed: Apr. 27, 2007

(65) Prior Publication Data

US 2007/0262213 A1    Nov. 15, 2007

(30) Foreign Application Priority Data

May 11, 2006    (BR) .................................... 0601993

(51) Int. Cl.
*F16M 11/24*    (2006.01)
(52) U.S. Cl. .................... 248/188.3; 248/649; 248/650; 248/615; 248/677
(58) Field of Classification Search .............. 248/188.3, 248/188.4, 188.2, 188.1, 188.5, 649, 650, 248/638, 615, 677, 562, 566, 476, 479
See application file for complete search history.

(56) References Cited

U.S. PATENT DOCUMENTS

| 5,332,182 | A  | * | 7/1994 | Weisz et al. .............. 248/188.4 |
| 5,344,116 | A  | * | 9/1994 | Winkler ...................... 248/677 |
| 6,442,906 | B1 | * | 9/2002 | Hwang ....................... 52/126.6 |
| 6,711,985 | B1 | * | 3/2004 | Doyle ........................ 92/117 A |
| 6,902,140 | B1 | * | 6/2005 | Huang ..................... 248/188.4 |
| 7,290,741 | B1 | * | 11/2007 | Cox et al. ................. 248/188.4 |
| 7,314,206 | B2 | * | 1/2008 | Lee et al. .................... 248/655 |
| 2007/0023591 | A1 | * | 2/2007 | Kwon et al. ............. 248/188.3 |

* cited by examiner

*Primary Examiner*—A. Joseph Wujciak, III
*Assistant Examiner*—Todd M. Epps
(74) *Attorney, Agent, or Firm*—Holland & Knight LLP; Brian J Colandreo, Esq.

(57) ABSTRACT

A self-leveling foot for an appliance of the type that includes a base to be seated on a floor; a rod affixed to the base and projecting upwardly therefrom; an elastic element having a lower end seated on the base and a tubular sleeve, slidably mounted and guided around the rod, and having a lower portion seated on the upper end of the elastic element and an upper portion to be mounted under a lower frame portion of the appliance, so as to apply on the base, through the elastic element, a respective portion of the appliance weight. The foot of the present invention may further comprise a dampening means mounted between the parts of rod and tubular sleeve, so as to exert a braking force against the relative axial movement between said parts.

12 Claims, 3 Drawing Sheets

SELF-LEVELING FOOT FOR AN APPLIANCE

FIELD OF THE INVENTION

The present invention refers to a self-leveling and stabilizing foot to be connected under a lower portion of a frame or cabinet of an appliance such as, for example, a household appliance in the form of a washing machine. Although being particularly appropriate for washing machines, the foot object of the present invention can be also used in other appliances, such as dryers, refrigerators, and the like.

PRIOR ART

Different appliances, such as the white line household appliances, are directly seated on the floor by means of feet, generally four feet, mounted under a frame lower portion of the appliance.

There are well known the feet of the fixed type or of the height-adjustable type, to compensate for irregularities of the floor, some models being also provided with rollers, with or without brakes, to facilitate the displacement of the appliance in determined situations.

The known feet, particularly the adjustable ones, are generally adequate for the appliances which operate without producing strong vibrations, as is the case of refrigerators, freezers and other appliances or devices whose cabinets are not submitted to oscillating masses under operation.

Nevertheless, even in the applications above, it is required from the user or installer to manually adjust the height of the feet as a function of the usual elevational differences of the floor, which operation requires special attention, besides being invariably uncomfortable and problematic, particularly when the appliance is installed in places that make difficult or impracticable the access to one or both rear feet.

In addition to the problem of adjusting the height of the appliance feet, it should be further considered the applications in which the appliance is submitted to strong vibrations during at least part of its operation, as it happens with the washing machines which, at least during the step of extracting water from the clothes, the so-called spinning step, are submitted to strong vibrations which are sufficient to cause undue displacements of the appliance on the floor on which it is installed, modifying the original position of installation. When the washing machine feet have not their heights adjusted, the machine presents an unstable seating condition on the floor, making it "shake" or "limp" when submitted to even small forces produced by oscillating masses. In this condition, the problem of vibration during the spinning operations makes even more serious the consequences of the unstable seating, as the machines seated in this way can intensely "limp" and vibrate during the spinning operations.

Said stronger vibrations are not generally absorbed by the suspension system of the moving parts of the appliance during determined operational steps, as it occurs when part of the load of clothes is unbalanced in the interior of the rotating basket, generating an excessive displacement of the moving parts. These situations may require a performance of the suspension system which surpasses its balancing capacity, permitting the vibrations, which are produced by the moving parts and generated in high rotation, to be transmitted to the frame or cabinet of the appliance. When these vibrations are transmitted to an appliance seated on feet that are not appropriately adjusted in height, the consequences of the vibrations for the appliance frame are highly undesirable, producing noise, displacements and undesirable wear, and also risks of damage.

Aiming at minimizing the deficiencies cited above, there is a prior art solution described in patent U.S. Pat. No. 5,344,116. In this solution, each foot is formed by a lower base to be placed on the floor and by an upper connecting element to be mounted under a lower frame portion of the appliance, the upper connecting element being seated on the base by means of an intermediate spring. In this construction, the base takes the form of a cylindrical housing, inside which the upper connecting element is telescopically guided, the upper connecting element carrying a peripheral elastic element which actuates against the cylindrical inner wall of the housing in the base and which functions as a spring in series with or parallel to the supporting spring, depending on the intensity of the forces applied by the upper connecting element to the supporting spring.

While allowing obtaining a self-leveling foot with great capacity of absorbing vibrations, the solution of patent U.S. Pat. No. 5,344,116 presents a complex and onerous construction, which limits the constructive possibilities of the base and transfers all the responsibility for the guidance of the relative vertical displacement between the lower and upper parts of the foot solely to the structure of the supporting spring and to the frictional displacement between the peripheral elastic element of the upper connecting element against the cylindrical inner wall of the housing defined in the base. This prior art self-leveling foot has low resistance to transversal forces applied to the appliance.

SUMMARY OF THE INVENTION

As a result of the drawbacks related to the structural complexity and fragility of the self-leveling foot defined in the prior art cited above, it is an object of the present invention to provide a type of foot which presents a simple and strong construction, with great capacity to withstand transversal forces between the upper and lower parts of the foot.

It is a further object of the invention to provide a self-leveling foot as defined above and which presents a dampening element that is capable to limit the relative vertical oscillations between the moving parts of the foot, in order to absorb the vibrations produced during the operational steps of the appliance seated thereon.

These and other objects of the present invention are achieved with the provision of a self-leveling foot, which comprises a base to be seated on any floor, in the ambient in which the appliance is installed, and a rod attached to the base and projecting upwardly therefrom. A tubular sleeve is slidably mounted and guided around the rod, being axially moveable in relation to the latter and having an upper portion mounted under the appliance and a lower portion seated on the upper end of an elastic element, generally a helical spring mounted around the rod, said elastic element having a lower end seated on the base. Thus, the elastic element transfers to the base a portion of the appliance weight associated with the respective sleeve seated on the elastic element, the rod functioning as a strong guide means for the tubular sleeve attached under the appliance, guaranteeing a high resistance for the foot to horizontal transversal forces exerted on the appliance, which can occur, for example, when the latter is forced to move, horizontally sliding on the floor.

In the proposed solution it may be also provided a dampening means mounted between the rod and the tubular sleeve, to apply a braking force to the relative axial movement between the rod and the tubular sleeve. Said braking force exerted by the dampening means provides an intense absorption of the vibrating energy transmitted from the appliance frame to the spring, guaranteeing the obtention of a necessary stabilizing function for the foot of the appliance.

BRIEF DESCRIPTION OF THE DRAWINGS

The invention will be described below with reference to the enclosed drawings, given by way of example of possible embodiments of the invention and in which.

DETAILED DESCRIPTION OF THE INVENTION

Figure 1:
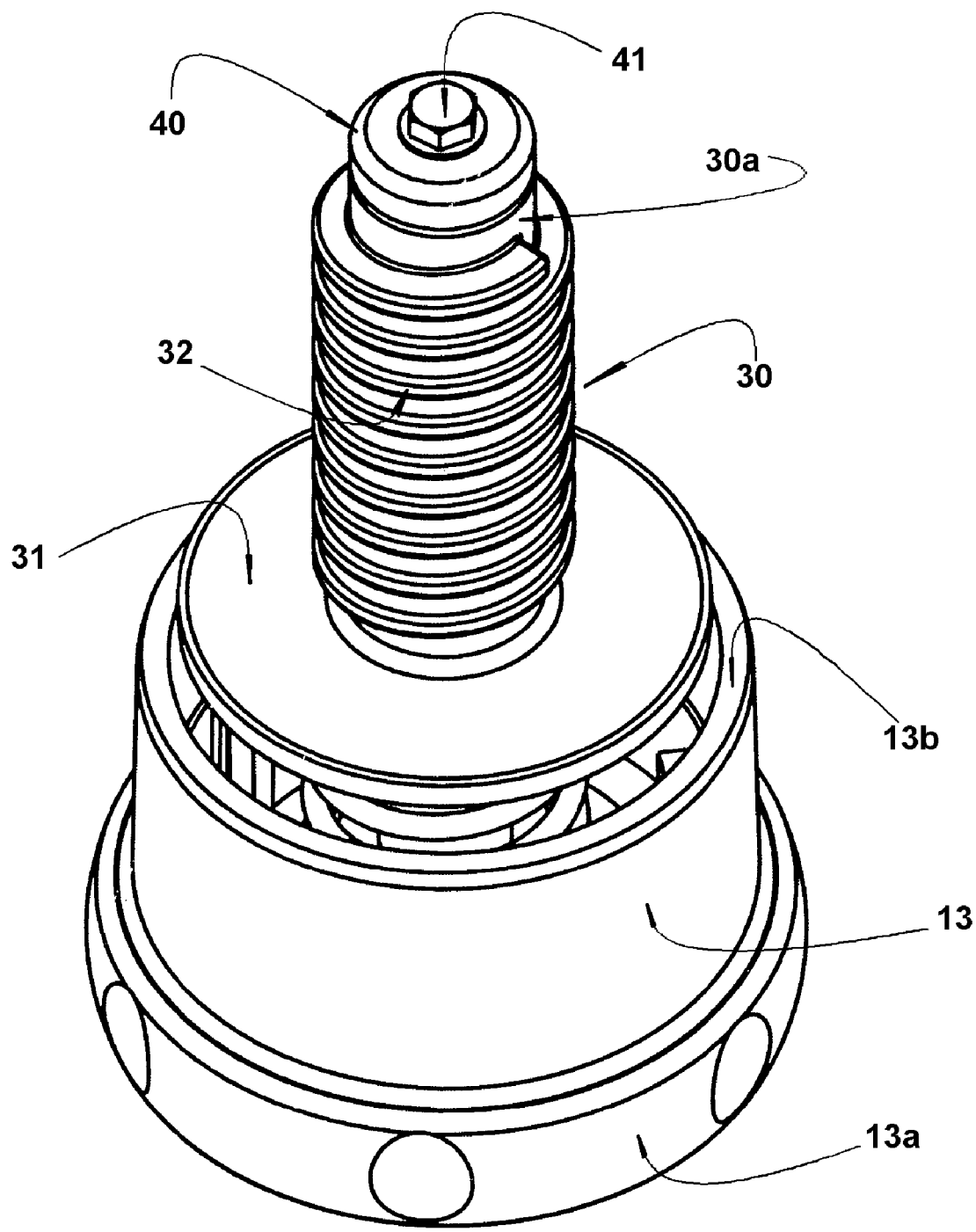
FIG. 1 represents a perspective view of the foot object of the present invention.
Figure 2:
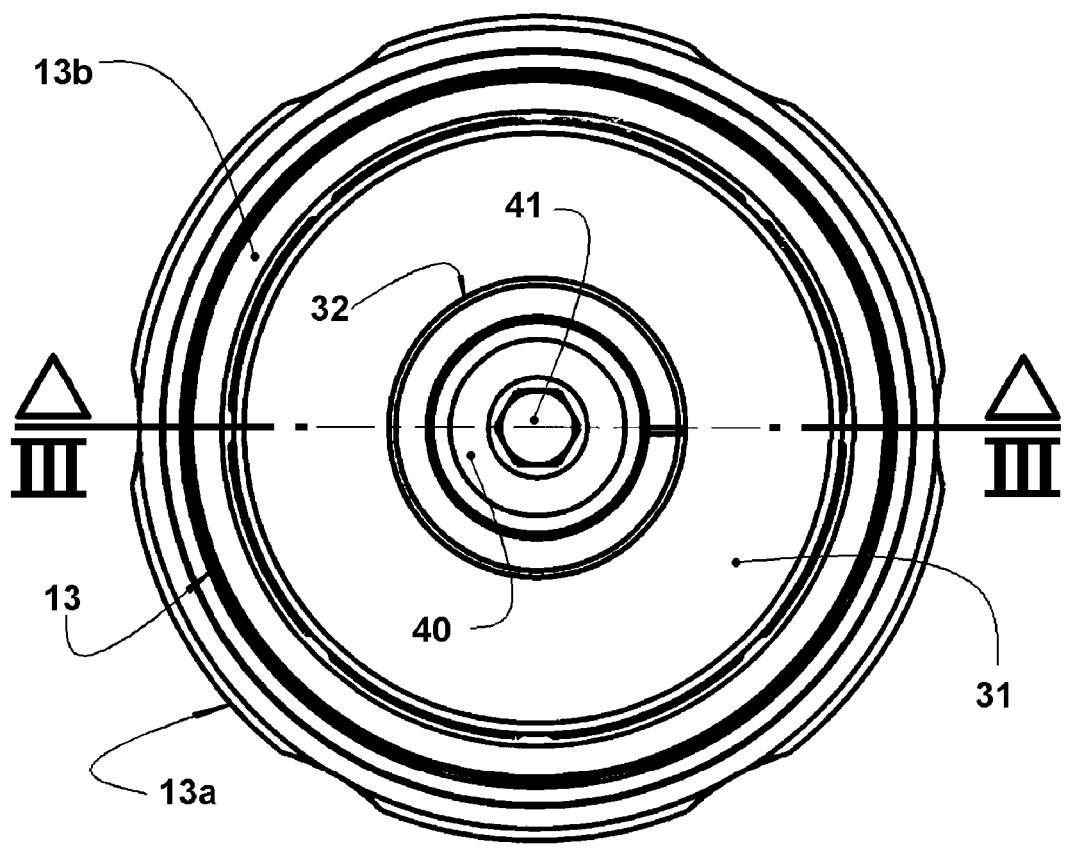
FIG. 2 represents a top plan view of the foot illustrated in FIG. 1.

As already mentioned and illustrated in the enclosed drawings, the self-leveling foot object of the present invention is of the type to be mounted under a lower frame portion of an appliance such as, for example, the washing machines in which the machine cabinet presents a lower frame portion 1 with any adequate construction, which permits the fixation of a plurality of feet, generally in the number of four. The lower frame portion 1 can be defined, for example, by a flat plate or by plate portions affixed or incorporated to the appliance frame or cabinet in the mounting regions of the feet.

According to the invention, the self-leveling foot comprises a base 10 constructed in steel, plastic or other adequate material and which, in the illustrated embodiment, takes the form of a plate of circular contour, presenting an upper face 10a and a lower face 10b and incorporating an upper peripheral wall 11. It should be understood that the base 10 can present different regular and irregular polygonal contours, without the selected shape altering the functionality of the foot proposed herein.

Figure 3:
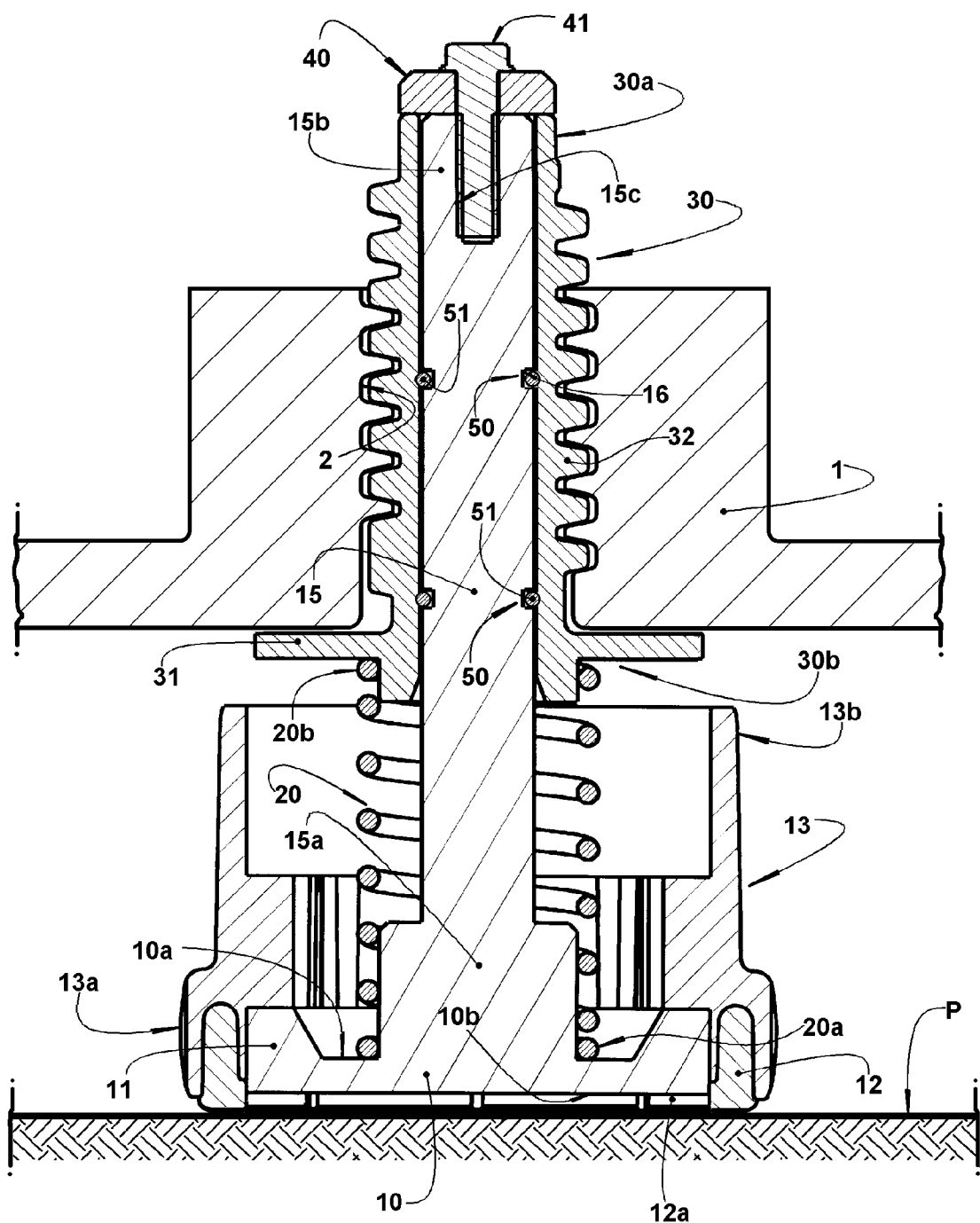
FIG. 3 represents a longitudinal vertical sectional view of the foot of the present invention, taken according to line III-III in FIG. 2 and schematically illustrating the supporting floor and a lower frame portion of the appliance.

Also according to the illustrated construction, the base 10 is peripherally and laterally surrounded by a band 12, usually made of a synthetic and anti-slip material, such as an elastomer, incorporating, in a lower edge, a small inner peripheral flange 12 dimensioned to seat under a peripheral portion of the lower face 10b of the base 10, defining an annular shoe to be seated on the floor P, maintaining the lower face 10b of the base 10 slightly spaced from said floor P, as illustrated in FIG. 3.

Further in accordance with the illustrated embodiment a finishing tubular cap 13 is provided, preferably in plastic material, presenting an outer lower portion 13a, fitted and affixed on the band 12 and on the upper peripheral wall 11 of the base 10, and an upper end portion 13b, projecting axially upwardly from the base 10 by an extension predetermined in project and which will be discussed ahead. It should be understood that the base 10 and the cap 13 can be formed in a single piece, in any adequate metal, plastic or composite material.

According to the invention, the self-leveling foot further comprises a generally cylindrical rod 15, having a lower end 15a attached to the upper face 10a of the base 10 and projecting upwardly therefrom, generally vertically and having a free upper end 15b. In the illustrated construction, the rod 15 is coaxial to the cylindrical base 10 incorporated to the base 10, forming therewith, and optionally with the cap 13, a single piece and presenting its lower end 15a with a transversal section that is enlarged in relation to that of the remainder of the axial extension of the rod 15. However, it should be understood that the rod 15 can be formed in a separate piece to be affixed to the base 10 by any appropriate fixation means.

Each self-leveling foot is further provided with an elastic element 20 having a lower end 20a, seated on an upper face 10a of the base 10, and an upper end 20b. In the illustrated construction, the elastic element 20 is defined by a helical spring arranged around the rod 15 and having its lower end mounted with reduced radial gap around the enlarged lower end 15a of the rod 15. It should be noted that the elastic element 20 can be constructed in different ways using laminar metal springs or a body made of an elastically deformable elastomer material.

Around the rod 15 is slidably mounted and guided a tubular sleeve 30, axially moveable in relation to the rod 15 and having a lower portion 30b seated on the upper end 20b of the elastic element 20 and an upper portion 30a to be mounted under the appliance. In the illustrated construction, the tubular sleeve 30 has its lower portion 30b projected to fit in the interior of an end recess provided in the elastic means 20 and, in the case of using a helical spring-shaped elastic means 20, the lower portion 30b of the tubular sleeve 30 is fitted in the interior of the upper end of the helical spring, said lower portion 30b incorporating, preferably in a single piece, an outer annular flange 31 against which is seated the upper end 20b of the elastic means 20.

The tubular sleeve 30 has its upper portion 30a constructed to facilitate its assembly under the frame lower portion 1 of the appliance. In the illustrated construction, the upper portion 30a of the tubular sleeve 30 is provided with an outer thread 32 configured to be adapted and retained in a corresponding threaded hole 2 of the lower frame portion 1. Nevertheless, it should be understood that it is possible to use different constructive arrangements to mount the tubular sleeve 30 to the lower frame portion 1.

With this construction, a respective portion of the appliance weight is applied onto the tubular sleeve 30 which, by being seated on the elastic element 20, applies said appliance weight portion, by means of the elastic element 20, on the base 10 and from this to the floor P. In order that the parts defined by the base-rod assembly, elastic element and tubular sleeve remain mounted together, independently of the fact that the foot is mounted under an appliance, a stop 40 is seated and retained in the upper end 15b of the rod 15, projecting radially outwardly from the contour of the latter, to limit the axial displacement path of the tubular sleeve 30, by action of the elastic element 20 or of any other piece, towards said upper end 15b of the rod 15.

The dimensioning of the component parts of the foot is made so that the elastic element 20 remains tightly positioned, or slightly compressed between the tubular sleeve 30 and the base 10, considering the actuation of the stop 40 over the upper end 15b of the rod 15.

In the illustrated construction, the stop 40 takes the form of a kind of washer which is attached by a screw 41 mounted in an axial threaded hole 15c provided in the upper end 15b of the rod 15. However, it should be understood that it is possible to use other stop designs and other fixation means at the upper end 15b of the rod 15, without these constructive modifications altering the function of the stop 40 in relation to the tubular sleeve 30.

The construction proposed by the invention allows the rod 15, solidly attached to the base 10, to operate as a safe guiding element for the tubular sleeve 30, withstanding high transversal forces that may be applied to the latter during the machine operation or displacement.

Aiming at giving to the foot a desired capacity of absorbing the vibrating energy resulting from the movement of the oscillating masses upon operation of the appliance, a dampening means 50 is provided, mounted between the parts of rod 15 and tubular sleeve 30, so as to exert a braking force against the relative axial movement between said parts.

In the illustrated construction, the dampening means 50 comprises two elastically deformable elements, preferably in the form of elastic rings 51, each being carried by one of the parts of rod 15 and tubular sleeve 30 and causing attrition against the other of said parts. As illustrated in FIG. 3, each elastic ring 51 is partially mounted in a circumferential groove 16 of the rod 15. In the illustrated example two elastic rings 51 are provided. However, it is possible to provide only one or more than two elastic rings 51 constructed to cause attrition to the tubular sleeve 30, braking the displacements of the latter in relation to the rod 15. Although only one way of carrying out the dampening means 50 has been illustrated herein, it should be understood that the elastic means 51 can be substituted by grease, foam and grease or by clamps.

As already mentioned above, the tubular cap 13 has the function of providing a finishing for the foot, maintaining invisible the elastic element 20 and the rod 15. Therefore, the tubular cap 13, which defines with the base 10 a kind of cup, has a height sufficient to surround laterally the extension of the rod 15 defined between the base 10 and the tubular sleeve 30 and also the elastic element 20. Moreover, the inner cross-section of the tubular cap 13 is dimensioned to allow the outer annular flange 31 of the tubular sleeve 30 to penetrate, with a radial gap, in the interior of the tubular cap 13 in intense compression conditions of the elastic element 20.

While only one embodiment of the invention has been illustrated herein, it should be understood that alterations can be made in the form and in the arrangement of different parts of the foot assembly, without departing from the constructive concept defined in the claims accompanying the present specification.

The invention claimed is:

1. A self-leveling foot for an appliance, comprising:
   a base to be seated on a floor;
   a rod affixed to the base and projecting outwardly therefrom;
   an elastic element having a lower end seated on the base and an upper end, wherein the elastic element is mounted around the rod; and
   a tubular sleeve slidably mounted and guided around the rod, so as to be axially displaceable in relation to the latter, said tubular sleeve having a lower portion seated on the upper end of the elastic element and an upper portion to be mounted under a lower frame portion of the appliance, so as to apply on the base, through the elastic element, a respective portion of the appliance weight, wherein:
   the rod presents a lower end with a cross-section dimensioned to be lodged with a reduced radial gap inside the lower end of the elastic element, and
   the self-leveling foot further comprises a dampening device mounted between the parts of the rod and tubular sleeve, so as to exert a braking force against the relative axial movement between said parts.

2. The self-leveling foot, as set forth in claim 1 wherein the elastic element is defined by a helical spring.

3. The self-leveling foot, as set forth in claim 1, wherein the dampening device comprises at least one elastically deformable element carried by one of the parts of rod and tubular sleeve and causing attrition against the other of said parts.

4. The self-leveling foot, as set forth in claim 3, wherein the elastically deformable element of the dampening device is defined by an elastic ring.

5. The self-leveling foot, as set forth in claim 4, wherein the elastic ring is partially mounted in a circumferential groove of the rod.

6. The self-leveling foot, as set forth in claim 1, wherein the rod presents an upper end carrying a stop to limit the path of the axial displacement of the tubular sleeve, by action of the elastic element, towards said upper end of the rod.

7. The self-leveling foot, as set forth in claim 6, wherein the stop takes the form of a washer secured to the upper end of the rod by a screw mounted in a threaded axial hole of said upper end of the rod.

8. The self-leveling foot, as set forth in claim 1, wherein in its lower portion, an outer annular flange to be seated against the upper end of the elastic element and, in its upper portion, an outer thread for mounting and affixing the tubular sleeve in a corresponding threaded hole provided in the lower frame portion of the appliance.

9. The self-leveling foot, as set forth in claim 1, wherein the base is peripherally laterally surrounded by a band made of an anti-slip material.

10. The self-leveling foot, as set forth in claim 9, wherein the assembly formed by the base and band carries a tubular cap which projects upwardly from the base by a height sufficient to laterally surround the extension of the rod defined between the base and the tubular sleeve.

11. The self-leveling foot, as set forth in claim 1, wherein the rod is incorporated in a single piece to the base.

12. The self-leveling foot, as set forth in claim 1, wherein the lower portion is disposed at a bottom-most part of the tubular sleeve.

* * * * *